United States Patent
Mortensen et al.

(10) Patent No.: US 11,577,210 B2
(45) Date of Patent: Feb. 14, 2023

(54) INDUCTION HEATING OF ENDOTHERMIC REACTIONS

(71) Applicant: HALDOR TOPSØE A/S, Kgs. Lyngby (DK)

(72) Inventors: Peter Mølgaard Mortensen, Roskilde (DK); Martin Østberg, Tune (DK); Poul Erik Højlund Nielsen, Fredensborg (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 209 days.

(21) Appl. No.: 15/754,803

(22) PCT Filed: Aug. 17, 2016

(86) PCT No.: PCT/EP2016/069482
§ 371 (c)(1),
(2) Date: Feb. 23, 2018

(87) PCT Pub. No.: WO2017/036794
PCT Pub. Date: Mar. 9, 2017

(65) Prior Publication Data
US 2018/0243711 A1 Aug. 30, 2018

(30) Foreign Application Priority Data

Aug. 28, 2015 (DK) .............. PA 2015 00513
Feb. 9, 2016 (DK) .............. PA 2016 00081

(51) Int. Cl.
*B01J 8/00* (2006.01)
*B01J 35/00* (2006.01)
(Continued)

(52) U.S. Cl.
CPC .............. *B01J 8/001* (2013.01); *B01J 8/0285* (2013.01); *B01J 8/0292* (2013.01); *B01J 19/087* (2013.01);
(Continued)

(58) Field of Classification Search
CPC ........ B01J 8/001; B01J 19/087; B01J 8/0292; B01J 8/0285; B01J 23/8892; B01J 23/78;
(Continued)

(56) References Cited

U.S. PATENT DOCUMENTS 2,765,330 A * 10/1956 Kirshenbaum ........ B01J 8/1809
422/142
3,697,420 A * 10/1972 Blaisdell et al. .. B01D 21/0009
210/695
(Continued)

FOREIGN PATENT DOCUMENTS

DK 2015 00118 A1 3/2015
FR 3 003 774 A1 10/2014
(Continued)

OTHER PUBLICATIONS

Thomas K. Houlding et al., "Application of alternative energy forms in catalytic reactor engineering", Green Processing and Synthesis, vol. 1, No. 1, Jan. 1, 2012, pp. 19-31.
(Continued)

*Primary Examiner* — Xiuyu Tai
(74) *Attorney, Agent, or Firm* — Buchanan Ingersoll & Rooney P.C.

(57) ABSTRACT

A reactor system for carrying out an endothermic catalytic chemical reaction in a given temperature range upon bringing a reactant into contact with a catalyst material. The reactor system includes a reactor unit arranged to accommodate catalyst material including one or more ferromagnetic macroscopic supports susceptible for induction heating
(Continued)

where the one or more ferromagnetic macroscopic supports are ferromagnetic at temperatures up to an upper limit of the given temperature range. The one or more ferromagnetic macroscopic supports are coated with an oxide, and the oxide is impregnated with catalytically active particles. The reactor system moreover includes an induction coil arranged to be powered by a power source supplying alternating current and being positioned so as to generate an alternating magnetic field within the reactor unit upon energization by the power source, whereby the catalyst material is heated to a temperature within the temperature range by the alternating magnetic field.

7 Claims, 8 Drawing Sheets

(51) Int. Cl.
  *B01J 37/02* (2006.01)
  *B01J 23/00* (2006.01)
  *B01J 23/745* (2006.01)
  *B01J 8/02* (2006.01)
  *B01J 23/889* (2006.01)
  *B01J 23/78* (2006.01)
  *B01J 23/75* (2006.01)
  *B01J 23/755* (2006.01)
  *C10K 3/02* (2006.01)
  *B01J 19/08* (2006.01)

(52) U.S. Cl.
  CPC ........... *B01J 23/002* (2013.01); *B01J 23/745* (2013.01); *B01J 23/75* (2013.01); *B01J 23/755* (2013.01); *B01J 23/78* (2013.01); *B01J 23/8892* (2013.01); *B01J 35/0033* (2013.01); *B01J 37/0225* (2013.01); *C10K 3/026* (2013.01); *B01J 35/008* (2013.01); *B01J 2208/00433* (2013.01); *B01J 2523/00* (2013.01); *C01B 2203/0233* (2013.01); *C01B 2203/0283* (2013.01); *C01B 2203/0855* (2013.01); *C01B 2203/1047* (2013.01); *C01B 2203/1052* (2013.01); *C01B 2203/1058* (2013.01); *C01B 2203/1082* (2013.01); *C01B 2203/1247* (2013.01); *C01B 2203/1614* (2013.01); *C01B 2203/1628* (2013.01); *Y02P 20/52* (2015.11)

(58) Field of Classification Search
  CPC ...... B01J 23/75; B01J 23/755; B01J 37/0225; B01J 23/002; B01J 23/745; B01J 35/0033; B01J 35/008; B01J 2523/00; B01J 2208/00433; B01J 27/22; B01J 23/8906; B01J 35/0013; B01J 8/1845; B01J 12/007; B01J 8/40; B01J 8/12; B01J 8/0015; B01J 23/88; B01J 8/087; B01J 23/44; B01J 8/1836; B01J 2208/00469; B01J 2208/0084; B01J 2208/00557; C10K 3/026; C01B 2203/0233; C01B 2203/1628; C01B 2203/0283; C01B 2203/1614; C01B 2203/0855; C01B 2203/1052; C01B 2203/1047; C01B 2203/1082; C01B 2203/1247; C01B 2203/1058; C01B 32/162; Y02P 20/52; C10G 2/333; C10G 2/332; H05B 2206/023; H05B 6/108; C23C 16/46; B82Y 40/00; B82Y 30/00; Y10T 117/10; Y10S 977/844; Y10S 977/90
  USPC ......................................................... 204/156
  See application file for complete search history.

(56) References Cited

U.S. PATENT DOCUMENTS

| 4,115,927 | A | | 9/1978 | Rosensweig | |
|---|---|---|---|---|---|
| 4,229,234 | A | | 10/1980 | Krutenat et al. | |
| 4,367,153 | A | * | 1/1983 | Seiver | B01J 35/026 252/62.55 |
| 4,541,920 | A | * | 9/1985 | Seiver | B01J 35/026 208/111.35 |
| 4,541,925 | A | * | 9/1985 | Seiver | B01J 35/026 208/111.05 |
| 6,488,907 | B1 | * | 12/2002 | Barnes | B01J 35/04 423/418.2 |
| 6,846,475 | B1 | | 1/2005 | Taguchi et al. | |
| 2003/0086839 | A1 | | 5/2003 | Rivin | |
| 2004/0176245 | A1 | | 9/2004 | Hagemeyer et al. | |
| 2005/0232858 | A1 | | 10/2005 | Hampden-Smith et al. | |
| 2007/0068933 | A1 | * | 3/2007 | Wilkes | B01J 8/0015 219/633 |
| 2007/0179053 | A1 | | 8/2007 | Lee et al. | |
| 2007/0204512 | A1 | | 9/2007 | Self et al. | |
| 2010/0056360 | A1 | | 3/2010 | Lee | |
| 2010/0249404 | A1 | * | 9/2010 | Friese | B01J 19/12 544/106 |
| 2011/0030939 | A1 | * | 2/2011 | Carroll | F28F 7/00 165/185 |
| 2011/0265738 | A1 | | 11/2011 | Ichikawa et al. | |
| 2011/0301363 | A1 | * | 12/2011 | Friese | B01J 10/00 549/290 |
| 2012/0215023 | A1 | * | 8/2012 | Friese | B01J 6/008 558/442 |
| 2013/0053608 | A1 | | 2/2013 | Mishima | |
| 2016/0023201 | A1 | | 1/2016 | Chaudret et al. | |

FOREIGN PATENT DOCUMENTS

| GB | 2 210 286 A | 6/1989 |
|---|---|---|
| JP | 2013-11538 A | 6/2013 |
| WO | WO 2006/071527 A2 | 7/2006 |
| WO | WO 2016/062551 A1 | 4/2016 |

OTHER PUBLICATIONS

International Search Report (PCT/ISA/210) dated Mar. 28, 2017, by the European Patent Office as the International Searching Authority for International Application No. PCT/EP2016/069482.
Written Opinion (PCT/ISA/237) dated Mar. 28, 2017, by the European Patent Office as the International Searching Authority for International Application No. PCT/EP2016/069482.
Danish Search Report dated Apr. 6, 2016 by the Davis Patent Office for corresponding Danish Application No. PA 2015 00513.
Corrected International Search Report (PCT/ISA/210) and Written Opinion (PCT/ISA/237) dated Dec. 21, 2016, by the European Patent Office as the International Searching Authority for International Application No. PCT/EP2016/069482, and letter to the EPO regarding this error with respect to one cited reference.

* cited by examiner

INDUCTION HEATING OF ENDOTHERMIC REACTIONS

FIELD OF THE INVENTION

This invention relates to a reactor system for carrying out an endothermic catalytic chemical reaction, a catalyst material for catalyzing an endothermic chemical reaction as well as a method for carding out an endothermic catalytic chemical reaction,

BACKGROUND OF THE INVENTION

Performing endothermic reactions will often be challenged by how efficient heat can be transferred to the reactive zone of the catalyst bad within a reactor unit. Conventional heat transfer by convection, conduction and/or radiation can be slow and will often meet large resistance in many configurations. This challenge can be illustrated with the tubular reformer in a steam reforming plant, which practically can be considered as a large heat exchanger with heat transfer as the rate limiting step. induction heating is a potential means to circumvent this challenge, as magnetic fields are able to permeate many materials and therefore may induce magnetic heating directly within the active zone inside a reactor unit.

The patent application WO2014/162099 discloses a method for heterogeneous catalysis of a chemical reaction using, in a reactor, at least one reagent and a catalytic composition that can catalyse the reaction within a given range of temperatures T. The at least one reagent Is brought into contact with the catalytic composition which comprises a ferromagnetic nanoparticulate component of which at the surface is formed at least partially by a compound that is a catalyst for the reaction. The ferromagnetic nanoparticulate component is heated by means of magnetic induction in order to reach a temperature within the range of temperatures. WO2014/162099 also describe a catalytic composition comprising a ferromagnetic nanoparticulate component that can be heated by magnetic induction to the reaction temperature, the surface thereof being at least partially formed by a catalyst compound for the reaction. The catalyst described in WO2014/162099 is limited to the ferromagnetic catalyst in the form of catalytic nano-particles.

It is desirable to provide a method, a catalyst material as well as a reactor system arranged to facilitate induction heating-of a catalytically active particle independently of whether they are ferromagnetic or not Thereby, induction heating of a broad variety of catalytically active particles and thus for catalysing a broad variety of different endothermic reaction are possible. At the same time, the induction heating provides for high heating rates.

BRIEF SUMMARY OF THE INVENTION induction heating is the process of beating an electrically conducting object (usually a metal) by magnetic induction, through heat generated in the object by eddy currents (also called Foucault currents) and/or hysteresis loss. An induction heater consists of an electromagnet, and an electronic oscillator which passes a high-frequency alternating current (AC) through the electromagnet. The rapidly alternating magnetic field penetrates the object, generating electric currents inside the conductor called eddy currents. The eddy currents flowing through the resistance of the material heat it by Joule heating. Eddy current heating is also denoted ohmic heating. In ferromagnetic (and ferrimagnetic and antiferromagnetic) materials like iron, heat may alternatively or additionally be generated by magnetic hysteresis losses. This is denoted ferromagnetic heating. The frequency of the current used depends on the object size, material type, coupling (between the induction coil and the object to be heated) and the penetration depth. An induction coil comprising a conductor bent into the form of a plurality of loops or windings is an example of an electromagnet.

A first aspect of the invention relates to a reactor system for carrying out an endothermic catalytic chemical reaction upon bringing a reactant info contact with a catalyst material. The reactor system comprises a reactor unit arranged to accommodate catalyst material comprising one or more ferromagnetic macroscopic supports susceptible for induction heating, where the one or more ferromagnetic macroscopic supports are ferromagnetic at temperatures up to an upper limit of the given temperature range T. The one or more ferromagnetic macroscopic supports are coated with an oxide, where the oxide is impregnated with catalytically active particles. The reactor system further comprises an induction coil arranged to be powered by a power source supplying alternating current and being positioned so as to generate an alternating magnetic field within the reactor unit upon energization by the power source, whereby the catalyst material is heated to a temperature within the given temperature range T by means of said alternating magnetic field.

The one or more ferromagnetic macroscopic supports are ferromagnetic at temperatures up to at least an upper limit of the given temperature range T, viz, also at temperatures above the upper limit of the given temperature range T. The term "up to an upper limit of the given temperature range T" is meant to denote appropriate temperatures up to this upper limit, such as any temperature between the standard ambient temperature and the upper limit of the given temperature range T.

When the catalyst material within the system for carrying-out of an endothermic catalytic reaction comprises one or more ferromagnetic macroscopic supports comprising catalytically active particles, the catalytically active particles are heated from the heating of the ferromagnetic macroscopic supports. The catalytically active particles may thus be any appropriate paramagnetic or ferromagnetic element or combination of appropriate paramagnetic or ferromagnetic elements. Hereby, the reactor system of the invention provides for catalyzing a variety of different reactions. An important feature of the induction heating process is that the heat is generated inside the object itself, instead of by an external heat source via heat conduction. Thus objects can be very rapidly heated.

However, if the catalytically active particles are ferromagnetic themselves, they will be heated indirectly by the induction heating of the macroscopic supports as well as directly by the magnetic field. Hereby, a very fast heating rate directly in the catalytically active particles is achievable as well. Moreover, a catalyst material which, upon being subjected to an alternating magnetic field, is ferromagnetic at relevant operating conditions, such as at all relevant temperatures up to the upper limit of the temperature range T, and possibly above, is advantageous as it will be explained below.

For ferromagnetic materials, induction heating takes place by both ferromagnetic/hysteresis heating and ohmic/eddy current heating. An estimation of the hysteresis heating is given by the formula: $P=\phi BdH*f$, where P denotes the heating power transferred to the material, B the magnetic flux density, dH the change In the magnetic field strength, and f the frequency of the alternating magnetic field. Thus, the heating power transferred to the material by hysteresis: heating is the area of the hysteresis curve times the frequency of the alternating magnetic field. An estimation of the ohmic/eddy current heating is given by $P=\pi/20.B_m^2+f.\sigma.l^2$, where P denotes the heating power transferred to the material, $B_m$ is the magnetic flux density induced in the material, I is a characteristic length of the material, $\sigma$ is the conductivity of the material and f is the frequency of the alternating magnetic field. Thus, the heating power transferred to the material by eddy current heating is proportional to the magnetic flux density squared as well as the frequency of the alternating magnetic field squared. Paramagnetic materials have a very small magnetic flux density B when subject to an alternating magnetic field compared to ferromagnetic materials. Therefore, ferromagnetic materials are much more susceptible to induction heating than non-ferromagnetic materials, and either alternating magnetic fields of a lower frequency are usable for ferromagnetic materials compared to non-ferromagnetic materials or a lower frequency of the alternating magnetic field may be used. Generating a high-frequency magnetic field is relatively expensive energetically, so the use of a lower frequency of the magnetic field provides for cheaper heating of the material. Here, a high-frequency magnetic field is meant to be a field having a frequency in the MHz range, maybe from to 0.1 or 0.5 MHz and upwards.

Ferromagnetic material provides for further advantages, such as:

A ferromagnetic material absorbs a high proportion of the magnetic field, thereby making the need for shielding less or even superfluous.

Heating of ferromagnetic materials is relatively faster and cheaper than heating of non-ferromagnetic materials. A ferromagnetic material has an inherent or intrinsic maximum temperature of heating, viz, the Curie temperature. Therefore, the use of a catalyst material which is ferromagnetic ensures that an endothermic chemical reaction is not heated above a specific temperature, viz, the Curie temperature. Thus, it is ensured that the chemical reaction will not run out of control.

As used herein, the term "macroscopic support" is meant to denote a macroscopic support material in any appropriate form providing a high surface. Non-limiting examples are metallic or ceramic elements, monoliths or miniliths. The macroscopic support may have a number of channels; in this case it may be straight-channeled or a cross-corrugated element. The material of the macroscopic support may be porous or the macroscopic support may be a solid. The word "macroscopic" in "macroscopic support" is meant to specify that the support is large enough to be visible with the naked eye, without magnifying devices.

The term "ferromagnetic heating" is meant to denote heating substantially generated by magnetic hysteresis losses within a material, upon subjecting it to an alternating magnetic field. The term "ferromagnetic heating" is synonymous to the term "hysteresis heating". The terms "eddy current heating", "ohmic heating", "resistive heating" and "Joule heating" are synonymous. Eddy current heating is the process by which the passage of an electric current through a conductor releases heat.

The material of the ferromagnetic macroscopic support is for example a metallic or ceramic material. Ferromagnetic material includes iron, nickel, cobalt, and alloys thereof.

The wash coating of a metal surface is a well-known process; a description is given in e.g. Cybulski, A., and Moulijn, J, A., Structured catalysts and reactors, Marcel Dekker, Inc, New York, 1998, Chapter 3, and references herein.

In an embodiment, the system is arranged for providing a given temperature range T, which is the range between about 400° C. and about 950° C. or a sub-range thereof. In an embodiment, the reactor system is arranged to pressurize the reactor unit in order to obtain a pressure within the reactor unit of between about 5 bar and about 30 bar.

When performing the steam reforming reaction, $CH_4+H_2O\rightleftharpoons CO+3H_2$, at a relatively low pressure, such as 5 bar, the required maximum temperature would be between about 800° C. and about 950° C. At a tar reforming reaction, $C_nH_m+nH_2O\rightleftharpoons nCO+(m/2+n)H_2$, the required maximum temperature would typically be between about 750° C. and about 950° C., whilst the pressure would be between 1 and 30 bar. The reverse water gas shift reaction, $CO_2H_2\rightleftharpoons CO+H_2O$, typically requires a maximum temperature between about 400° C. and about 750° C. at a pressure between 1 and 30 bar. Thus, preferred temperature sub-ranges of the given temperature range T are the range between about 750° C. and about 950° C., the range between about 800° C. and about 950° C., or the range between about 400° C. and about 750° C. However, other sub-ranges of the range from about 400° C. to about 950° C. are conceivable depending on which reaction is to be carried out in the reactor system.

In an embodiment, the Curie temperature of the ferromagnetic macroscopic supports equals an operating temperature at substantially the upper limit of the given temperature range T of the endothermic reaction. This provides for a self-regulating system in that the ferromagnetic macroscopic supports are heated to the equilibrium temperature and can easily be maintained at this temperature. This is due to the fact that the catalyst material will cycle between being paramagnetic and consequently practically non-heating at temperatures above the Curie temperature, and being ferromagnetic and thus heating at temperatures below the Curie temperature.

The induction coil is placed within the reactor unit, around the reactor unit or around a pressure shell enclosing the reactor unit. In some embodiments the reactor unit is able to be pressurized in itself. In this case, the induction coil may be placed within the reactor unit or around the reactor unit. In other embodiments, the reactor unit is not in itself able to provide the necessary pressure for a required reaction; in this case, the reactor unit may be placed within a pressure shell, and the induction coil may be placed within the reactor unit, on the outside of the reactor unit but within the pressure shell or outside the pressure shell. If the induction coil is placed within the reactor unit, it is preferable that it is positioned at least substantially adjacent to the inner wall(s) of the reactor unit in order to surround as much of the catalyst material as possible. In the cases, where the induction coil is placed within the reactor unit, windings of the reactor unit may be in physical contact with catalyst material. In this case, in addition to the induction heating, the catalyst material may be heated directly by ohmic/resistive heating due to the passage of electric current through the windings of the induction coil. The reactor unit and, if present, the pressure shell are typically made of non-ferromagnetic material.

In an embodiment, the distance between windings of said induction coil is varied along a longitudinal axis of the reactor unit. This is advantageous in that induction heating is effective and may render high temperatures, also in the vicinity of the inlet of the reactor unit. High temperatures at the inlet of the reactor unit may cause carbon formation at the catalyst, if the catalyst temperature is higher than the equilibrium temperature of the chemical reaction. The graded, heating is to take place so that the heating is lass intensive at the inlet to the reactor unit and becomes more intensive towards the outlet. Thus, the distance between successive windings of the induction coil are to be smaller towards the outlet of the reactor unit than towards the inlet end of the reactor unit.

in an embodiment, the catalyst material comprises two or more-types of catalyst materials along the catalyst bed, where the two or more types of catalyst material have different Curie temperatures. This is an alternative or additional way to provide graded heating.

Another aspect of the invention relates to a catalyst material for catalysing an endothermic chemical reaction in a reactor in a given temperature range T upon bringing a reactant into contact with the catalyst material. The catalyst material comprises a ferromagnetic macroscopic support coaled with an oxide. The oxide is impregnated with catalytically active particles. The one or mere ferromagnetic macroscopic supports is/are susceptible for induction heating when subject to an alternating magnetic field and wherein the one or more ferromagnetic macroscopic supports are ferromagnetic at temperatures up to an upper limit of the given temperature range T.

When the catalyst material within the system for carrying out an endothermic catalytic reaction comprises a ferromagnetic macroscopic support with catalytically active particles, the catalytically active particles are heated from the heating of the ferromagnetic macroscopic supports upon subjecting the ferromagnetic macroscopic support for induction heating. The direct contact between the catalytically active particles and the ferromagnetic macroscopic supports enables efficient heating of the catalytically active phase from solid material conduction from the induction heated ferromagnetic macroscopic support. The catalytically active panicles may thus be any appropriate paramagnetic or ferromagnetic element. Hereby, the catalyst material of the invention provides for catalyzing a variety of different reactions.

Moreover, it the catalytically active particles are ferromagnetic themselves, they will be heated indirectly by the induction heating of the macroscopic supports as well as directly by the magnetic field. Hereby, an even faster heating rate of the catalytically active particles is achievable.

The shape of the macroscopic support is any appropriate form providing a high surface macroscopic support Non-limiting examples are metallic or ceramic elements, monoliths or miniliths. The macroscopic support may have a number of channels; in this case it may be straight-channeled or a cross-corrugated element. The material of the macroscopic support may be porous or file macroscopic support may be a solid.

The dimensions of the macroscopic support are typically in the range of cm, viz. between about 0.5 cm and about 15 cm. Larger sizes, e.g. up to about 50 cm, are also conceivable. When pellet catalyst is used in tubular reformers, it is generally recognised that the ratio of the tube diameter to the diameter of catalyst pellets should be above 4-5. This ratio also applies in this case, so that the diameter or size of the reactor unit should be at least 4-5 times the size of the macroscopic supports should in order to avoid excess pressure drop. However, with a single macroscopic support in the form of a monolith this constraint is eliminates* opening the possibility for more compact reformers.

In an embodiment, the material of the ferromagnetic macroscopic support is an alloy comprising iron and chromium, an alloy comprising iron, chromium and aluminum, an alloy comprising iron and cobalt, or an alloy comprising iron, aluminum, nickel and cobalt, "Alnico alloys" are a specific type of alloys comprising iron, aluminum, nickel and cobalt, and maybe also copper, titanium and other elements, whilst FeCrAlloys comprises iron, chromium and aluminum. The term "an alloy comprising X and Y" is meant to denote an alloy which has X and Y as major components and possibly comprising further elements, iron and Its alloys respond very well to induction heating, due to their ferromagnetic nature. Eddy currents can, however, be generated In any conductor, and magnetic hysteresis can occur in any magnetic material.

In an embodiment, the oxide is an oxide comprising aluminum, zirconium and cerium. The oxide may e.g. AlZr-CeO$_x$. The oxide may additionally comprise magnesium, silicon and/or titanium.

In an embodiment, the oxide is furthermore impregnated with ferromagnetic nanoparticles. Thus, when the catalyst material is subjected to a varying magnetic field, both the ferromagnetic macroscopic support and the ferromagnetic nanoparticles impregnated into the oxide of the ferromagnetic macroscopic support are heated. Whilst the ferromagnetic macroscopic support heats the catalyst material from within, the ferromagnetic nanoparticles heats from the outside of the oxide. Thereby, a higher temperature and/or a higher heating rate are/is achievable.

In an embodiment, the catalytically active particles comprise nickel, ruthenium, rhodium, a combination of nickel and cobalt or a combination of manganese and zirconium. Nickel, optionally in combination with cobalt, is suitable for catalysing steam reforming and far reforming reactions, whilst a combination of manganese and zirconium is suitable for catalysing the reverse water gas shift reaction.

In an embodiment, the Curie temperature of the ferromagnetic structured elements substantially equals an operating temperature at substantially the upper limit of the given temperature range T of the endothermic reaction. Hereby, a self-regulating system is provided, in that the ferromagnetic macroscopic supports are heated to the equilibrium temperature and can easily be maintained at this temperature.

A further aspect of the invention relates to a method for carrying out of an endothermic catalytic chemical reaction in a given temperature range T in a reactor system. The reactor system comprises a reactor unit arranged to accommodate catalyst material comprising one or more ferromagnetic macroscopic supports susceptible for induction heating, where the one or more ferromagnetic macroscopic supports are ferromagnetic at temperatures up to an upper limit of the given temperature range. The one or more ferromagnetic macroscopic supports is/are coated with an oxide, and the oxide is impregnated with catalytically active particles. An induction coil is arranged to be powered by a power source supplying alternating current and is positioned so as to generate an alternating magnetic field within the reactor unit upon energization by the power source. The catalyst material is heated to a temperature within the given temperature range T by means of the alternating magnetic field. The method comprising the steps of:

(i) Generating an alternating magnetic field within the reactor unit upon energization by a power source supplying alternating current, where the alternating magnetic field passes through the reactor unit, thereby heating the catalyst material;

(ii) bringing a reactant info contact with the catalyst material;

(ii) healing of this reactant by the catalyst material;

(iv) letting the reactant react in order to provide a product to be outlet from the reactor unit.

By the process of the invention, the catalyst material is heated by induction. This provides the heat necessary for the endothermic catalytic chemical reaction, The heating of the reactant is provided by conduction when the reactant is brought into contact with the catalyst material, typically by being adsorbed onto the surface of the catalyst material, as well as by convection prior to the reactant contacting the: surface of the catalyst material. The sequence of the steps (i) to (iv) is not meant to be limiting. Step (ii) and (iii) may happen simultaneously, or step (iii) may be initiated before stop (ii) and/or take place at the same time as step (iv).

The one or more ferromagnetic macroscopic supports are ferromagnetic at temperatures up to at least an upper limit of the given temperature range T, viz. also at temperatures above the upper limit of the given temperature range T, However, the Curie temperature of the ferromagnetic structured elements may substantially equal the upper limit of the temperature range T. in this instance, it is ensured that the reaction temperature does not exceed the Curie temperature substantially and the chemical reaction is prevented from run-away.

The method typically further comprises the step of recovering the product outlet from the reactor unit, in an embodiment, the method furthermore comprises the step of pressurizing the reactor unit to a pressure of between 5 and 30 bar. The temperature range T is the range from between about 400° C. and about 950° C. or a sub-range thereof, preferably between about 700° C. and about 950 ° C. or a sub-range thereof.

In an embodiment oi the according to she invention, the Curie temperature of the ferromagnetic structured elements equals an operating temperature at substantially the upper limit of the given temperature range T of the endothermic reaction. Hereby, a self-regulating system is provided, in that the ferromagnetic macroscopic supports are heated to the equilibrium temperature and can easily be maintained at this temperature.

In an embodiment of the method according to the invention, the heating of the catalyst material is graded along the reactor bed. This is advantageous in that induction heating is effective and may render high temperatures, also in the vicinity of the inlet of the reactor unit. High temperatures at the inlet of the reactor unit may cause carbon formation at the catalyst, if the catalyst temperature is higher than the equilibrium temperature of the chemical reaction. The graded heating is to take place so that the heating is less intensive at the inlet to the reactor and becomes more Intensive towards the outlet.

According to one aspect, the graded heating can be done by varying the distance between windings of said induction coil. Thus, the distance between successive windings should be larger towards the inlet end of the reactor than towards the outlet end.

Alternative or additionally, the catalyst material may comprise two or more types of catalyst materials along the catalyst bed, where the two or more types of catalyst material have different Curie temperatures. If the catalyst material closest to the inlet of the reactor unit has a lower Curie temperature than the catalyst material closest to the outlet of the reactor, it is possible to control the maximum temperature achievable within the reactor so that it is less close to the inlet end than further along the reactor unit.

BRIEF DESCRIPTION OF THE FIGURES

FIG. 8 shows the performance of an Alnico based ferromagnetic macroscopic support in a start-up experiment.

DETAILED DESCRIPTION OF THE FIGURES

Figure 1:
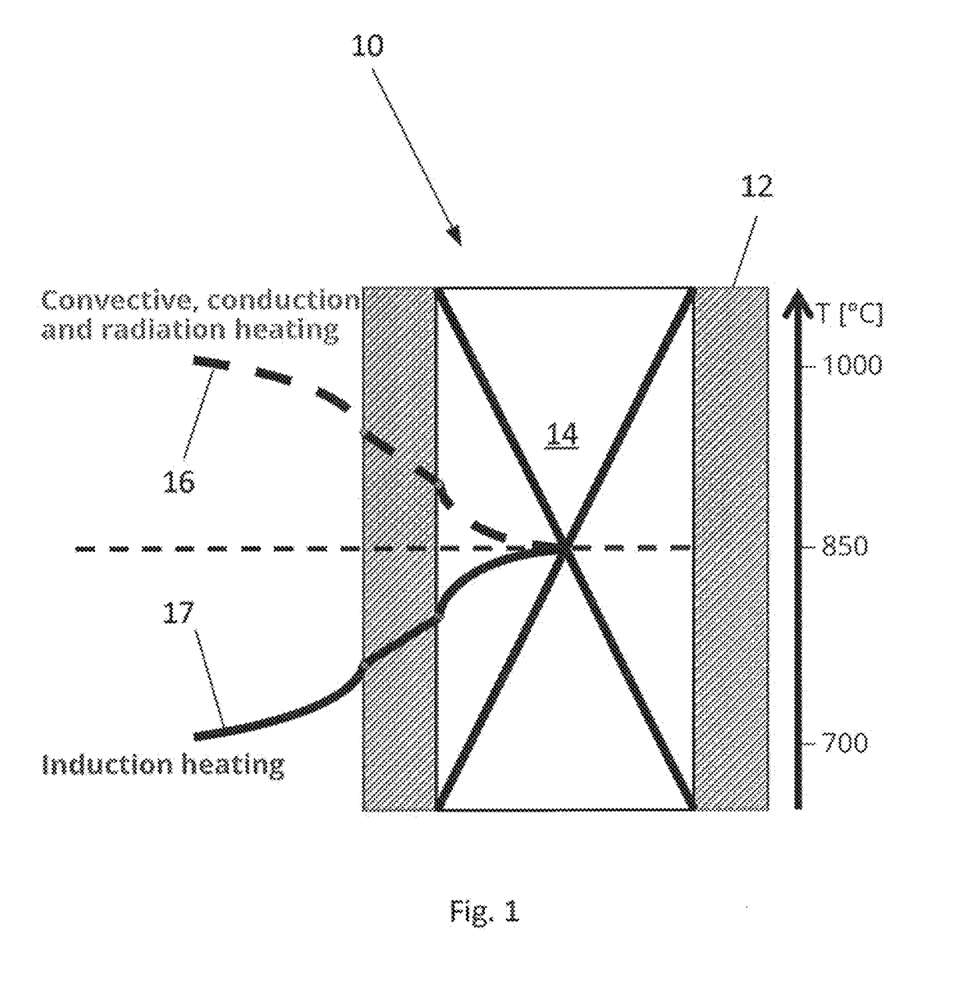
FIG. 1 is a graph showing temperature profiles of a reactor unit heated by convective/conductive and/or radiation heating, and induction healing, respectively.

FIG. 1 is a graph showing temperature profiles of a reactor unit 10 heated by convective/conductive and/or radiation heating, and induction heating, respectively during an endothermic reaction within the reactor unit 10. The temperature profiles in FIG. 1 are indicated together with a schematic cross-section through a reactor unit 10 having walls 12 holding a catalyst bed 14 with catalyst material for endothermic reactions. The catalyst material in the catalyst bed 14 Is susceptible to inductive heating. Means for heating the reactor unit 10 and/or the catalyst bed 14 are hot shown, in the case of convective, conduction and/or radiation heating, the means for heating could e.g. be fired burners; means for induction heating would typically be an electromagnet, e.g. an induction coil. A temperature scale is Indicated at the right side of FIG. 1. The horizontal dotted line Indicates a temperature of 850° C. at the centre of the catalyst bed.

The dotted curve 18 indicates the temperatures outside the reactor unit, at the reactor unit wails as wells as within the catalyst bed 14 when heated by convective/conductive and/ or radiation heating, whilst the solid curve 17 indicate the temperatures outside the reactor unit, at the reactor unit walls as well as within the catalyst bed 14 when heated induction heating.

It is clear from FIG. 1, that in the case of convective/ conductive and/or radiation heating, the temperature is higher outside the wall 12 than within the wall 12, and that the temperature within the catalyst bed 14 is lower than that at the wall 12. At the center of the catalyst bed, the temperature is at its lowest. This is because the temperature at the heat source must be higher than the reaction zone and due to the temperature loss through the walls and due to the endothermic nature of the reaction within the reactor unit 10. In contrast, the temperature profile as indicated by the curve 17 shows that for induction heating the temperature is higher at the wall 12 compared to outside the reactor unit, whilst the temperature inside the catalyst bed increases from the wall 12 to the center of the catalyst bed 14.

In general, performing endothermic reactions is limited by how efficiently heat can be transferred to the reactive zone of the catalyst bed 14. Conventional heat transfer by convection/conduction/radiation can be slow and will often meet large resistance in many configurations. Moreover, heat losses within the walls of the reactor play a role. In contrast, when heat is deposited inside the catalyst bed 14 by the induction concept, the catalyst bed will be the hottest pad of the reactor 10 in contrast to conventional heating where the exterior heat source has to be significantly hotter than the internal part to have a driving mechanism for the heat transfer. Furthermore, induction heating provides a quick heating of the catalyst bed.

To make the catalyst bed susceptible for induction, different approaches may be applied. One approach is to heat the catalyst by induction by making the catalytically active particles of the catalyst ferromagnetic at reaction temperatures. In this approach it has been established that a reforming catalyst can be made with an active phase of a Ni—Co alloy, which is both active for steam reforming and ferromagnetic at temperatures above 700° C. However, it has been indicated that having nanoparticles alone as the ferromagnetic phase will be insufficient for heating the catalyst feed. In another approach, being the approach of the invention, catalyst material comprising one or more ferromagnetic macroscopic supports are coated with an oxide impregnated with the catalytically active phase. This approach offers a large versatility compared to the ferromagnetic nanoparticles in the catalyst, as the choice of catalytic active phase is not required to be ferromagnetic.

In addition to the possibility of delivering heat directly to the catalyst material, induction heating offers a fast heating mechanism, which potentially could make upstart of a reforming plant relative fast.

FIGS. 2a-2e show schematic drawings of five embodiments 100a, 100b, 100c, 100d, and 100e of a reactor system, in FIGS. 2a-2e, similar features are denoted using similar reference numbers.

Figure 2A:
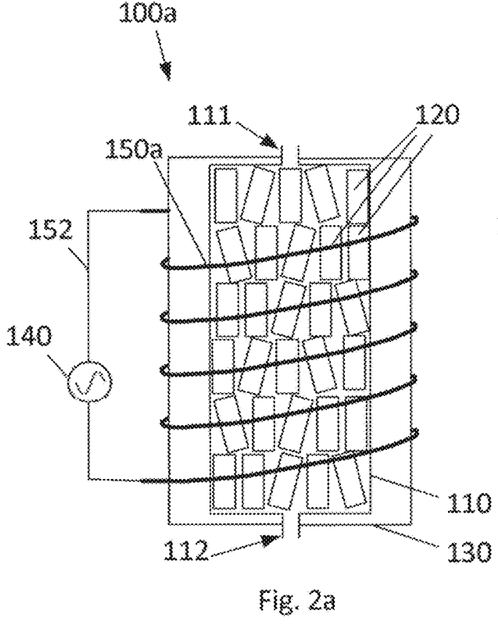
FIGS. 2a-2e show schematic drawings of four embodiments of a reactor system.

FIG. 2a shows an embodiment of the reactor system 100a for carrying out an endothermic catalytic chemical reaction upon bringing a reactant into contact with a catalyst material 120. The reactor system 100a comprises a reactor unit 110 arranged to accommodate catalyst material 120 comprising one or more ferromagnetic macroscopic supports susceptible for induction heating. The one or more ferromagnetic macroscopic supports are coated with an oxide, and the oxide is impregnated with catalytically active particles.

Reactant is introduced into the reactor unit 110 via an inlet 111, and reaction products formed on the surface of the catalyst material 120 is outlet via an outlet 112. A pressure shell 130 surrounds the reactor unit 110 and is arranged tor pressurizing the reactor unit 110. The inlet and outset 111, 112 as well as the pressure shell 130 have appropriate gaskets, seals or the like (not shown in FIG. 2a).

The reactor system 100a further comprises an induction coil 150a arranged to be powered by a power source 140 supplying alternating current. The induction coil 150a is connected to the power source 140 by conductors 152. The induction coil 150a is positioned so as to generate an alternating magnetic field within the reactor unit 110 upon energization by the power source 140. Hereby the catalyst material 120 is heated to a temperature within a given temperature range T relevant for carrying out the chemical reaction, by means of the alternating magnetic field. In the embodiment of FIG. 2a, the induction coil 150a is position on the. outside of the pressure shell 130.

FIGS. 2b-2e show other embodiments 100b, 100c, 100d and 100e of the reactor system for carrying out an endothermic catalytic chemical reaction. The reactor unit 110 and its inlet and outlet 111, 112, the catalyst material 120, the pressure shell 130 (in FIGS. 2b and 2c), the power source 140 and its connecting conductors 152 are similar to those of the embodiment shown in FIG. 2a.

Figure 2B:
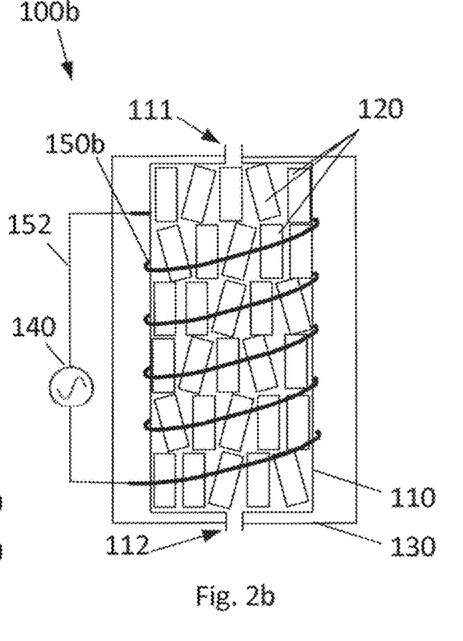

In the embodiment of FIG. 2b, an induction coil 150b is wound or positioned around the outside of the reactor unit 110, within the pressure shell 130. The conductors 152 connecting the induction coil 150b and the power source 140 are led through the pressure shell 130 at openings (not shown) arranged to let the conductors 152 pass through a wall of the pressure shell 130 without depriving the pressure shell 130 of its pressurizing ability.

Figure 2C:
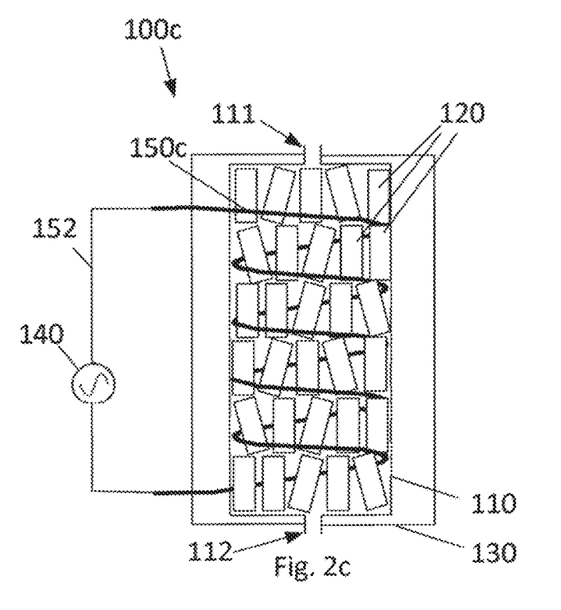

In the embodiment of FIG. 2c, an induction coil 150c is positioned within the reactor unit 110, and thus also within the pressure shell 130. The induction coil 150c of FIG. 2c is placed substantially adjacent to the inner surface of the reactor unit 110 in order to enclose as much of the reactor volume as possible. The induction coil 150c is typically also in physical contact with the catalyst material 120. In this case, in addition to the induction heating provided by the magnetic field, the catalyst material 120 adjacent the induction coil 150c is additionally heated directly by ohmic/resistive heating due to the passage of electric current through the windings of the induction coil 150c. The conductors 152 connecting the induction coil 150c and the power source 140 or parts of the induction coil 150c are led through the pressure shell 130 at openings (not shown) arranged to let the conductors 152 or parts of the induction coil 150c pass through a wall of the pressure shell 130 without depriving the pressure shell 130 of its pressurizing ability.

Figure 2D:
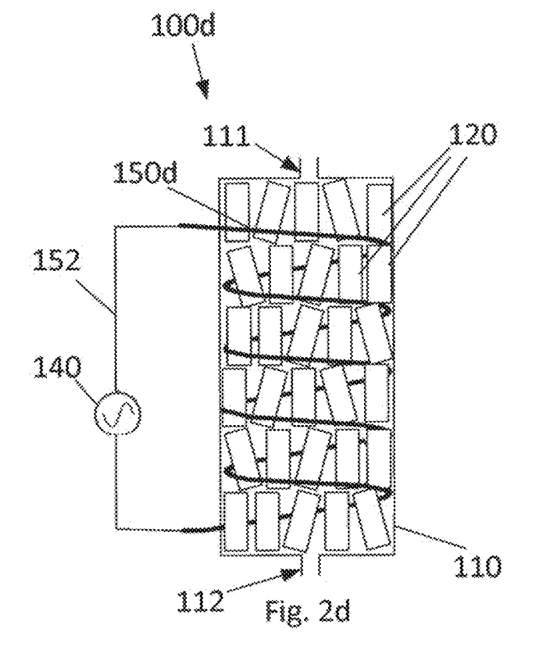

In the embodiment of FIG. 2d, an induction coil 150d is positioned within the reactor unit 110; however, in the embodiment of FIG. 2d no pressure shell is present in the reactor system. In one embodiment of the reactor system 100d shown in FIG. 20, the reactor unit 110 is able to pressurize its content, in another embodiment of the reactor system 100d, the reactor unit 110 is not able put its content to a substantially elevated pressure; this may be the ease for reactor units for e.g. far reforming or reverse water-gas shift reactions. However, the reactor unit 110 should be arranged to provide a small excess pressure within the reactor unit in order to ensure sufficient flow of the reactant and product streams.

The induction coil 150d of FIG. 2d is placed substantially adjacent to the inner surface of the reactor unit 110 and in physical contact with the catalyst material 120. In this case, in addition to the induction heating provided by the magnetic field, the catalyst material 120 adjacent the induction coil 180d is additionally heated directly by ohmic/resistive heating due to the passage of electric current through the windings of the induction coil 160c.

Figure 2E:
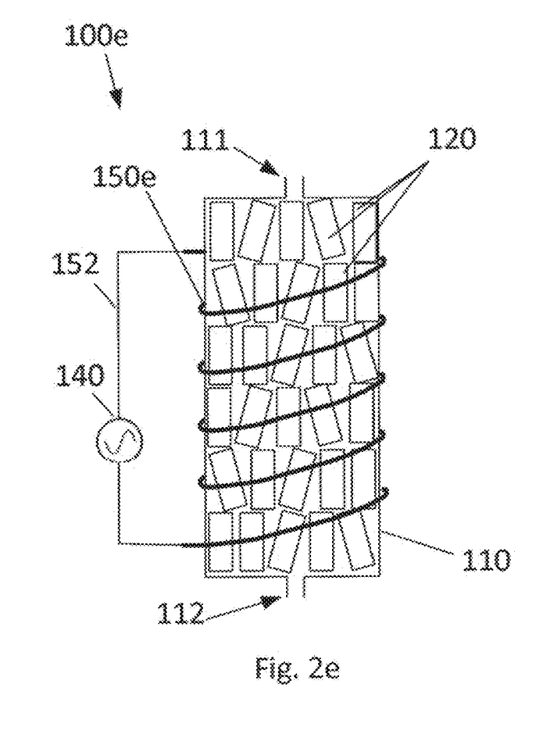

In the embodiment of FIG. 2e, an induction coil 150e is wound or positioned around the outside of the reactor unit 110; however, in the embodiment of FIG. 2d no pressure shell is present in the reactor system. In one embodiment of the reactor system 100d shown in FIG. 2d, the reactor unit 10 is able to pressurize its content. In another embodiment of the reactor system 100d, the reactor unit 110 is not able to put its content to a substantially elevated pressure; this may be the case for reactor units for e.g. tar reforming or reverse water-gas shift reactions. However, the reactor unit 110 should be arranged to provide a small excess pressure within the reactor unit in order to ensure sufficient flow of the reactant and product streams.

The conductors 162 connecting the induction coil 150c and the power source 140 or parts of the induction coil 150c are led through the pressure shell 130 at openings (not shown) arranged to let the conductors 152 or parts of the induction coil 150c pass through a wall of the pressure shell 130 without depriving the pressure shell 130 of its pressurizing ability.

In all five embodiments shown in FIGS. 2a-2e, the catalyst material can be any catalyst material according to the invention. Thus, the catalyst material may be in the forms of a single monolith taking up substantially all the volume of the reactor unit 110, in the form of a plurality of macroscopic supports carrying catalyst particles in an oxide. Thus, the catalyst material is not limited to catalyst material having relative size as compared to the reactor system as shown in the figures. Moreover when the catalyst material comprises a plurality of macroscopic supports, the catalyst material would typically be packed so as to leave less space between the macroscopic supports than shown in the FIGS. 2a-2e. Furthermore, in all five embodiments shown in FIGS. 2a-2e, the reactor unit 110 to and the pressure shell 130 (only relevant for the embodiments of FIGS. 2a-2c) are made of non-ferromagnetic material, in all tour embodiments of FIGS. 2a-2e, the power source 140 is an electronic oscillator arranged to pass a high-frequency alternating current (AC) through the coil surrounding at least pad of the catalyst material within the reactor system.

Figure 3A:
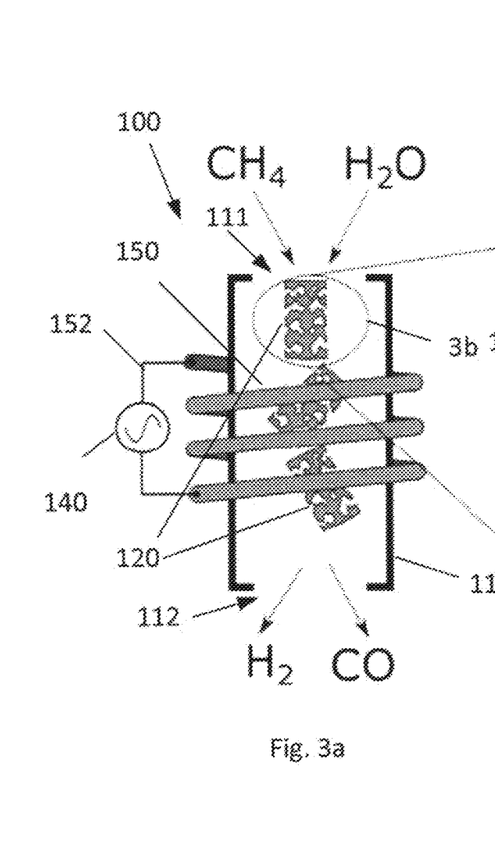
FIGS. 3a-3c are a schematic view of a reactor system with a plurality of catalysis elements, a schematic and enlarged view a single catalyst element, and a schematic and further enlarged view of a part of the surface of the catalyst element, respectively.
Figure 3B:
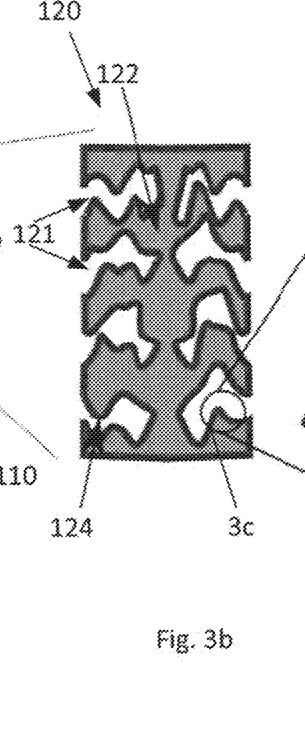
Figure 3C:
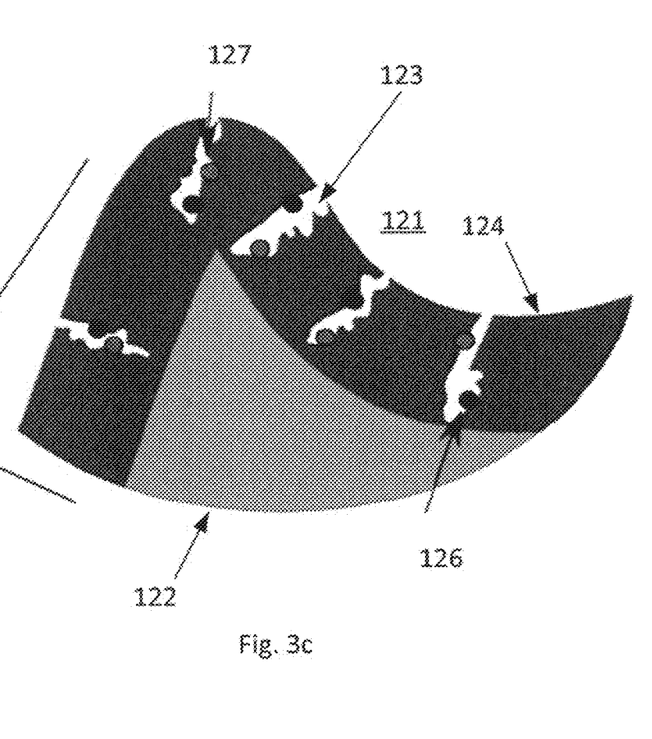

FIGS. 3a-3c are a schematic view of a reactor system 100 with a plurality of catalysts elements 120, a schematic and enlarged view a single catalyst element 120, and a schematic and further enlarged view of a part of the surface of the catalyst element 120, respectively. As used herein, the term "catalyst element" is meant to denote a ferromagnetic macroscopic support coated with an oxide, where the oxide is impregnated with catalytically active particles.

FIG. 3a shows a reactor system 100 wherein a reactor unit 110 holds a plurality of catalyst elements 120. The reactor unit 110 has an inlet 111 through which methane ($CH_4$) and water ($H_2O$) are inlet and an outlet 112 through which hydrogen ($H_2$) and carbon monoxide (CO) are outlet. The reactor system 100 comprises an induction coil 160 powered by a power source 140 connected to the induction coils by means of conductors 152. The embodiment shown in FIG. 3a may be similar to the embodiment shown in FIG. 2b or 2a; however, the pressure shell is not shown in FIG. 3a. Alternatively, the embodiment shown in FIG. 3a is an embodiment without a pressure shell (the reactor unit 110 being able to pressurize its content) and with the coil 150 wound around the outside of the reactor unit 110.

Figure 3D:
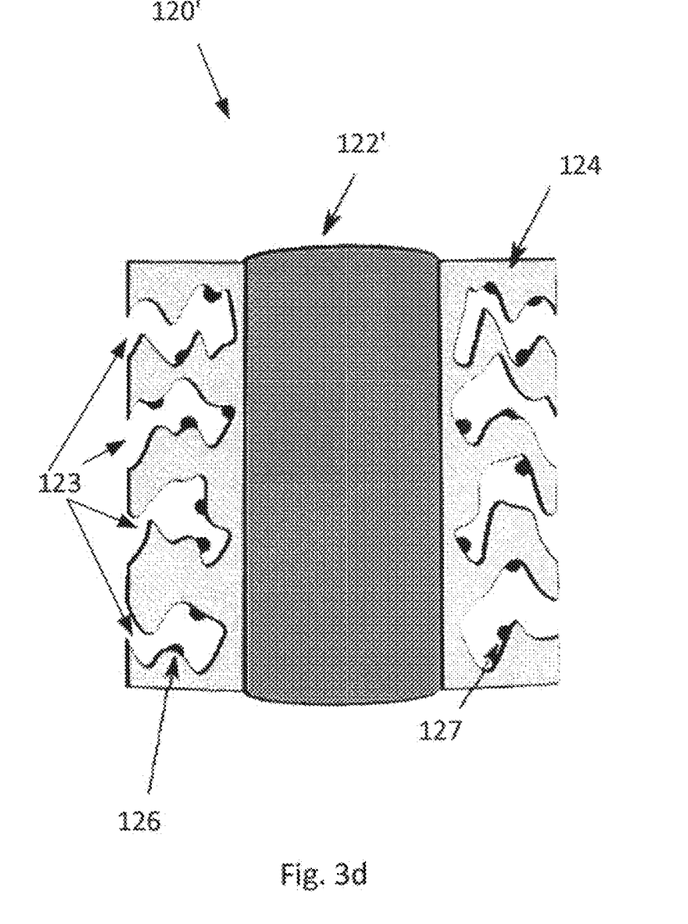
FIG. 3d is a schematic view of an alternative catalyst element.

The upper catalyst element of FIG. 3a is encircled and denoted "3b" to indicate that this catalyst element is shown in an enlarged view in FIG. 3d. The catalyst element 120 of FIG. 3d comprises a porous macroscopic support 122 having pores, voids or, channels 121. The surface of the macroscopic support 122 is coated with an oxide 124.

In the lower right hand side of FIG. 3b, a part of the catalyst element 120 is encircled and denoted "3c" to indicate that this part of the catalyst element 120 is shown in an enlarged view In FIG. 3c.

FIG. 3c shows a cross-section through the small part of the catalyst materiel encircled in FIG. 3b. The parts of the catalyst material facing upwards and to the left in FIG. 3c are covered by oxide 124 coaled unto the macroscopic support 122. The oxide 124 is porous and has been impregnated with catalytically active nanoparticles 127 as well as ferromagnetic nanoparticles 126.

The porous coated macroscopic support thus has a porous oxide surface, which also has pores, voids or channels 123. These pores, voids or channels 123 assist in providing a large surface area that can be impregnated with practically any catalytic phase, enabling it for application in any reaction which can be catalyzed by supported catalysts.

In the schematic FIG. 3c, only a few of these nanoparticles are shown in the pores/voids/channels 123 of the porous oxide. Even though FIG. 3c indicates two different kinds of particles 128, 127, the invention is not limited to this embodiment.

Alternatively, only catalytically active particles 127 maybe impregnated into the oxide, or the catalytically active particles 127 may be both ferromagnetic and catalytically active. This is for example the case for catalytically active elements nickel, iron, cobalt as well as alloys of these metals. Moreover, more than two types of particles could be impregnated into the oxide.

FIG. 3d is a schematic view of an alternative catalyst element 120' comprising a macroscopic support 122' coated with an oxide 124. Whilst both the macroscopic support 120 and the oxide 124 are porous in the-embodiment shown in FIGS. 3a-3c, the macroscopic support 120' shown in FIG. 3d is not a very porous material. Instead the macroscopic support 120' might be a solid material having any appropriate shape for coating with an oxide, FIG. 3d shows an enlarged cross-section of a small part of the surface of the macroscopic support 122'. Advantageously, the macroscopic support 120' has a shape providing a high surface, such as monoliths or miniliths, with a number of channels. The surface of the macroscopic support 122' is coated with a porous oxide 124 having a plurality of pores, voids or channels 123 assisting in providing the catalyst material a large surface area that can be Impregnated with practically any catalytic phase, enabling It for application in any reaction which can be catalyzed by supported catalysts.

The oxide 124 has been impregnated with catalytically active nanoparticles 127 as well as ferromagnetic nanoparticles 126. As in relation to the embodiment shown in FIG. 3b, the invention is not limited to catalyst material having two different kinds of nano-particles. There may be more than two kinds of nanoparticles impregnated into oxide, only catalytically active particles 127 may be impregnated Info the oxide, or the catalytically active particles 127 may be both ferromagnetic and catalytically: active.

For all embodiments shown in FIGS. 2a-3d, if has bean found that suitable ferromagnetic macroscopic supports may be composed of metals of FeCr-Alloy or Alnico, FeCr-Alloy has a Curie temperature of ca. 560° C. and is therefore most suitable for reaction having maximum temperatures below this, whilst Alnico has a high Curie temperature of 860° C. and is therefore suitable for high temperature processes. The oxide coating can for example be an oxide made of a combination of Al, Zr, Ce, etc.

Figure 4A:
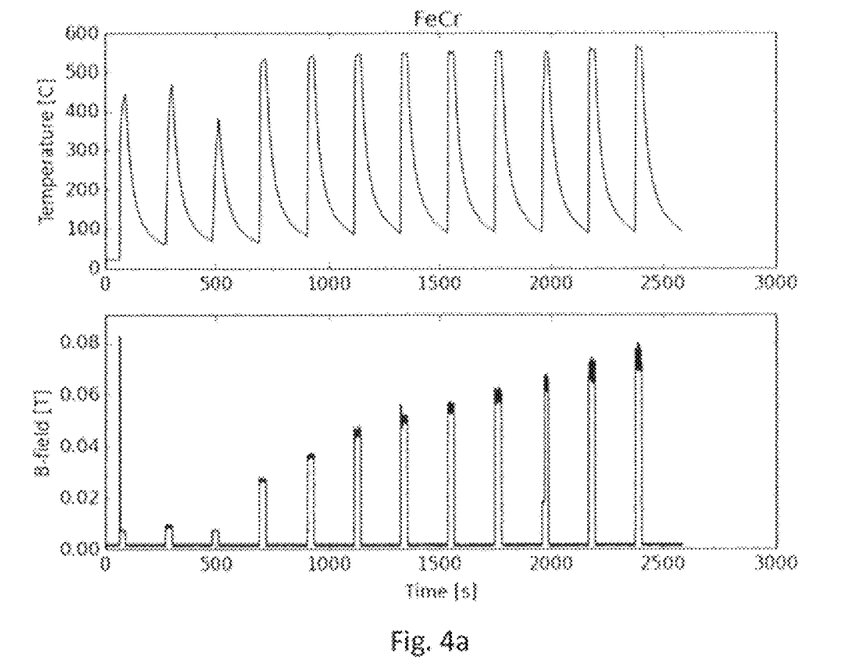
FIGS. 4a and 4b show heating profiles of FeCr- and Alnico-alloys in a varying magnetic field.
Figure 4B:
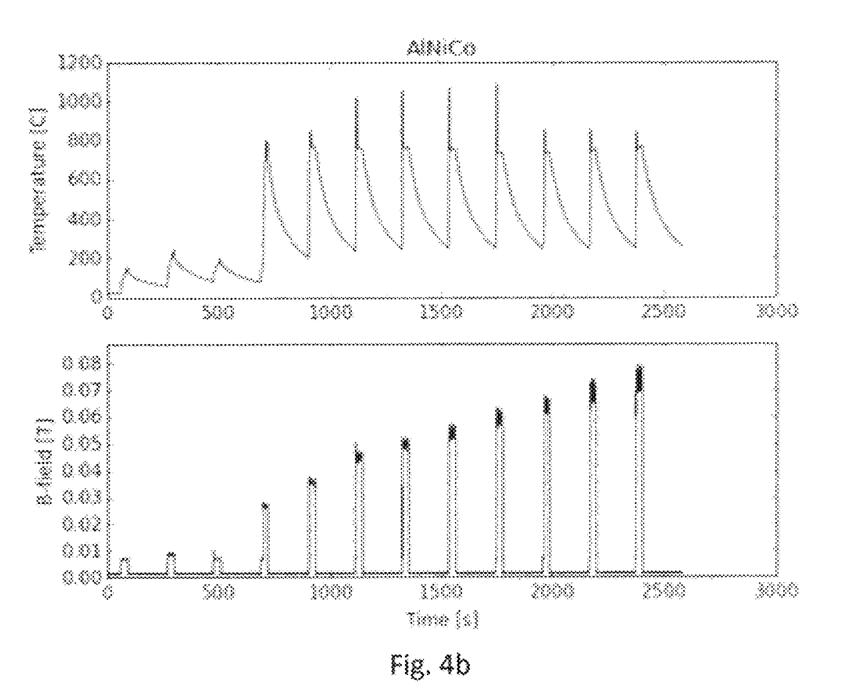

FIGS. 4a and 4b show heating profiles of samples of FeCr- and Alnico-alloys in a varying magnetic field. In both figures, the temperature is shown in the top graph and the variation in the magnetic field in the bottom graph.

FIG. 4a shows the heating, profile, of FeCrAlloy as a function of time at a magnetic field strength varied between 0.01 T and 0.08 T and a frequency of 55.7 kHz. From the profiles of FIG. 4a it is apparent that a very rapid heating can he achieved by induction, with a heating rate of ca. 160° C./s, corresponding to a heat input of 72 W/g. From FIG. 4a it is seen that the temperature achievable is limited by the Curie temperature and heating is significantly slower above this and therefore the heating profile flattens at 550-560° C.

In contrast to the FeCrAlloy, an Alnico alloy has a higher Curie temperature. Therefore a higher temperature can be achieved with an Alnico alloy, easily reaching 800° C., as shown in FIG. 4b. The spikes in the temperature profile of FIG. 4b, going from about 800° C. to up to more than 1000° C. are to be seen as measurement errors.

Overall, both FeCr alloys and Alnico alloys maybe heated with high intensity and with more than 150° C./S, The most evident difference of the materials is their Curie temperature which will limit their use. The lower Curie temperature of FeCr alloy means that this can only be used up to around 550° C., whilst the Alnico alloy may be heated by induction to at least 800° C.

It is expected that the maximum temperature to which the alloys may be heated will be increased slightly by incorporating a ferromagnetic phase with a higher Curie temperature in the oxide coating.

It should be stressed that the measurements above are sensitive to the placement of the thermocouple, indicating the temperature, on the sample and also sample dimension and shape of the catalyst material due to shielding effects of the magnetic field.

Moreover, it should be stressed that the measurement shown in FIGS. 4a and 4b are only two examples of the magnetic field used, and that a large range of values of the magnetic field strength and the frequency of the magnetic field is conceivable. In general a low frequency magnetic field having a relatively high magnetic field strength will provide good induction heating. More specifically, the magnetic field generated by induction advantageously has an amplitude between about 5 mT and about 1000 mT, preferably between about 5 and about 200 mT, and a frequency of between about 0.5 kHz and about 400 kHz.

Figure 5:
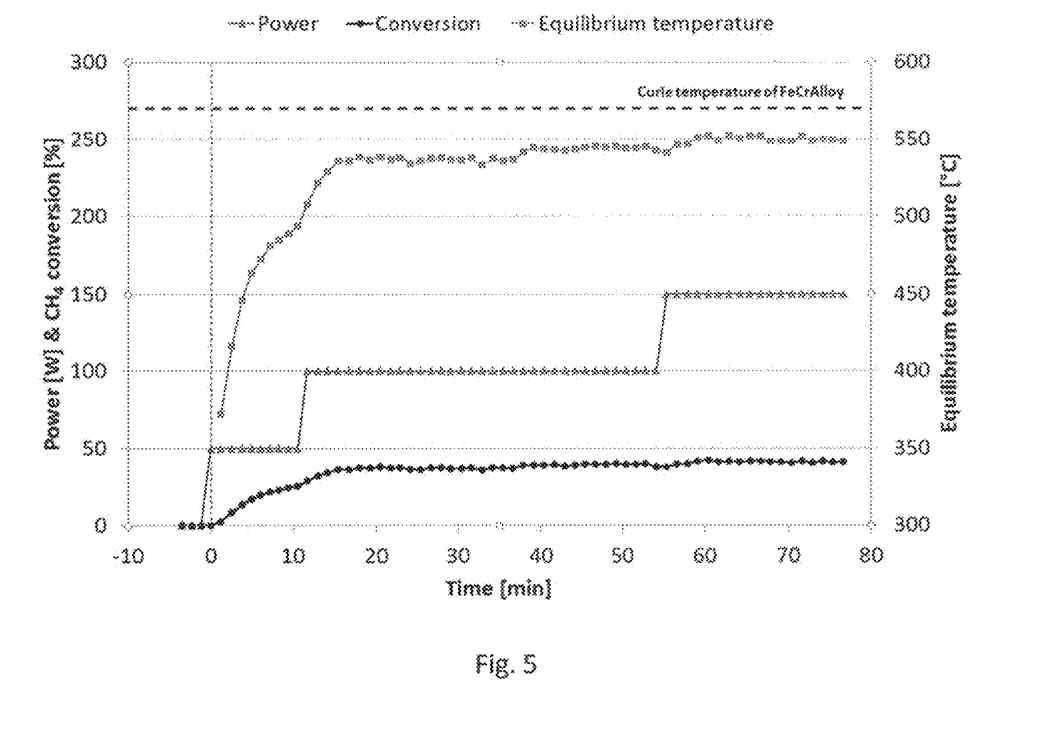
FIG. 5 shows the performance of a FeCrAlloy based ferromagnetic macroscopic support in a start-up experiment.

FIG. 5 shows the performance of a FeCrAlloy based ferromagnetic macroscopic support in a start-up experiment. The FeCrAlloy based ferromagnetic macroscopic support is impregnated with Ni as active phase in an induction field. The curve with circles is the methane conversion, the curve with squares is the equilibrium temperature and the curve with triangles is the power to the induction coil. Total flow=28 Ni/h, inlet temperature=200° C., $H_2O/CH_4$=2, $y_{H2,inlet}$=11%, P≈0 barg.

The performance of a FeCrAlloy based macroscopic support impregnated with nickel as active phase was investigated in a start-up experiment where the conversion of methane and the steam reforming equilibrium temperature were followed as a function of time on stream. The power output of an induction oven was increased at start-up (0 minutes), at 11 minutes and at 54 minutes from startup, as shown in FIG. 5. In this experiment, an online MS was used for quantifying the gas composition. When starting up at the time "0 minutes", a fast response of the system was observed, and steady state was achieved in ca. 10 minutes, when starting from cold. In this period, the temperature had at least increased to about 500° C. as illustrated by the equilibrium temperature and the $CH_4$ conversion is about 27%. This trend was the same when increasing the power after 11 minutes, where the gas composition reached a steady state within about 6 minutes and a methane conversion of about 40% was achieved.

At high power setting, the FeCrAlloy based macroscopic support became limited by its Curie temperature of 566° C., and consequently, the equilibrium temperature could not increase further when increasing the power from 100 to 150 W at 54 minutes, steadily being at about 545-550° C. The $CH_4$ conversion is a bit above 40%, FIG. 8 shows the performance of an Alnico based ferromagnetic macroscopic support in a start-up experiment. The curve with the circles is the methane conversion, the curve with the squares is the equilibrium temperature and the curve with the triangles is the power to the induction coil. Total flow=50 Ni/h, inlet temperature≈200° C., $H_2O/CH_4$=2, $y_{H2,inlet}$=11%, P≈0 barg.

Figure 6:
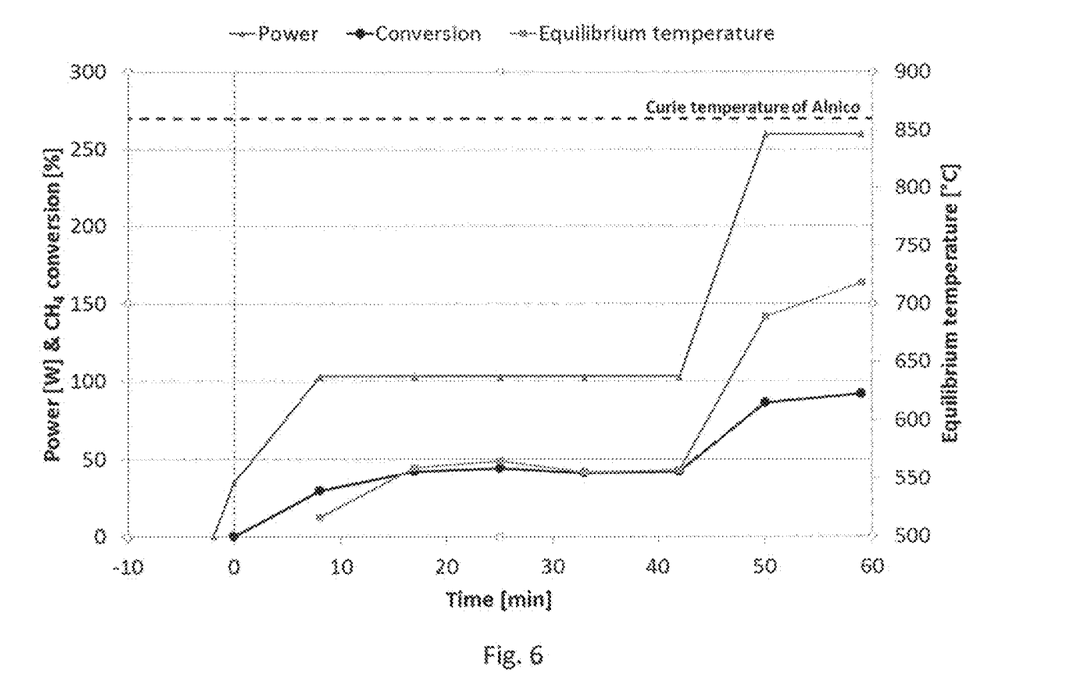

The performance of an Alnico based ferromagnetic macroscopic support impregnated with nickel as active phase was investigated in another start-up experiment, where the conversion of methane and the steam reforming equilibrium temperature were followed as a function of time on stream while increasing the power output of the induction oven, as shown in FIG. 6. In this experiment, an online GC-TCD was used for quantifying the gas composition. When starting up at time equal 0 min, a fast response of the system was observed, where steady state was achieved in about 10 minutes when starting from cold, in this period, the temperature had at least increased to 550° C. This trend was the same when increasing the power (to 200 W) after 45 minutes, where the system easily reached a steady state and a methane conversion of about 90%. The high Curie temperature of Alnico of 860° C. meant that it was possible to achieve high conversions of methane and therefore high equilibrium temperatures, in the shown example in FIG. 6 the equilibrium temperature was 718° C. at its highest.

EXAMPLES

In the following some examples are given in relation to the invention, in the reactor system used for the reactions, the induction coil may be placed within the reactor unit, around the reactor unit or around a pressure, shell holding the reactor unit, as appropriate.

As noted above, a general advantage of using induction heating as compared to side fired reformers or top fired reformers, is that such fired reformers are limited in the hot part by the heat transfer rate to the catalytic zone. By use of induction, this heat transfer limitation can be circumvented since the catalyst, material itself is heated directly by the magnetic flux from an induction coil positioned so as to generate an alternating magnetic field within the reactor unit holding the catalyst material.

Steam Reforming

A first example of an endothermic chemical reaction for which the invention is suitable is steam reforming, generating i.a. hydrogen. Today, the decentralized market for hydrogen is often dependent on expensive distribution and storage of hydrogen. As an alternative to this, induction heated reforming could be envisioned as a small scale hydrogen production technology potentially with fast startup for ad hoc hydrogen production and a heating system based on electricity instead of a fired hot box.

The catalyst material for the steam reforming reaction, $CH_4+H_2O \rightleftharpoons CO+3H_2$, at a temperature within the temperature range from about 800 to about 950° C. is for example a macroscopic support of Alnico alloy coated with a $ZrAlMgO_x$ based coat and impregnating with Ni and optionally also Co as active phase. This results in a ferromagnetic catalyst material with a Curie temperature of about 860° C.

Hydrogen production can be facilitated at 860° C. and 5 bar with a steam to hydrocarbon carbon ratio of 2 using this catalyst material for the reaction. The heat for the reaction is supplied by a magnetic field which is supplied by an induction coil The concept is well suited for small scale hydrogen production. When performing the reaction at low pressure (5 bar), in comparison to 30 bar in large scale industry plants, the required maximum temperature would be 800-850° C., making induction heating possible.

Tar Reforming

A further example of an endothermic chemical reaction for which the invention is suitable is the tar reforming reaction $C_nH_m+nH_2O \rightleftharpoons nCO+(m/2+n)H_2$, which may take place at a temperature within the range from about 750 to about 950° C.

A suitable catalyst material is for example a macroscopic support of Alnico alloy coated with a $ZrAlMgO^*_x$ based coat and impregnating with nickel as active phase. This results in a ferromagnetic catalyst material with a Curie temperature of about 860° C.

Reverse Water Gas Shift

Yet a further example of an endothermic chemical reaction for which the invention is suitable is the reverse water gas shift $CO_2+H_2 \rightleftharpoons CO+H_2O$, typically taking place at a temperature within the range from about 400 to about 750° C.

A suitable catalyst material is for example a macroscopic support of Alnico alloy coated with a $ZrAlMgO_x$ based coat and impregnating with oxides of manganese and zirconium as the catalytically active particles. Suitable catalytically active particles of oxides of manganese and zirconium are described in EP1445235.

For the above examples, when NiCo is the active phase/catalytically active particles, the NiCo combination may e.g. comprise 50±25 wt % Ni and 50±25 wt % Co.

When the oxide coating is an oxide made of a combination of Al, Zr, Ce, an example of the amounts of these elements would be 70±30 wt % Zr, 10±5 wt % Ce and 10±5 wt % Al.

The FeCr Alloy may e.g. comprise 73 wt % Fe, 23 wt % Cr and 5 wt % Al, whilst the Alnico alloy may have the following combination of elements: 40±15 wt % Fe, 30±10 wt % Co, 15±5 wt % Ni, 8±4 wt % Al, 0-5 wt %. Cu, 0-8 wt % Ti.

The oxide coating will typically adhere to the macroscopic support by oxide-oxide inter-action. The macroscopic support is initially oxidized at a high temperature in order to make a surface oxide on the macroscopic support's surface. In a subsequent oxide coating step, the oxide based coating then adheres to the oxide layer on the surface of the macroscopic support.

As used herein, the understanding of magnetic material classification is as follows:

Paramagnetic materials: A magnetic moment only exists when the material is exerted to an external magnet field; otherwise the dipoles within the material are scrambled. Such a material is often also referred to as nonmagnetic.

Ferromagnetic materials: This type of material can maintain a magnetic moment in the absence of an external magnetic field.

Ferrimagnetic materials: Materials made of combinations of atoms/ions which have different orientation on magnetic spin of different sizes. This group of materials has a net magnetic moment.

Antiferromagnetic materials: Materials made of combinations of atoms/ions which have different orientation on the magnetic spin of the same size. The net magnetic moment on this type of material is zero as it is cancelled out by the opposing magnetic moments.

The invention claimed is:

1. A reactor system for carrying out an endothermic catalytic chemical reaction in a given temperature range T upon bringing a gas reactant into contact with a catalyst material to produce a gas product, said reactor system comprising:

a reactor unit arranged to accommodate catalyst material comprising a fixed bed of one or more ferromagnetic macroscopic supports susceptible for induction heating, where said one or more ferromagnetic macroscopic supports are ferromagnetic at temperatures up to an upper limit of the given temperature range T, where said one or more ferromagnetic macroscopic supports is/are coated with an oxide in the form of an individual coating, where the oxide is impregnated with catalytically active particles, wherein the reactor unit comprises:
a reactant inlet disposed at the top end of the reactor unit; and
a product outlet disposed at the bottom end of the reactor unit, wherein the oxide is impregnated with catalytically active particles subsequent to the one or more supports being coated with the oxide, wherein the macroscopic supports have a dimension of at least 0.5 cm, an induction coil arranged to be powered by a power source supplying alternating current and being positioned so as to generate an alternating magnetic field within the reactor unit upon energization by the power source, whereby the catalyst material is heated to a temperature within said temperature range T by means of said alternating magnetic field.

2. A reactor system according to claim 1, wherein the system is arranged for providing a given temperature range T, which is the range between about 400° C. and about 950° C. or a sub-range thereof.

3. A reactor system according to claim 1, wherein the reactor system is arranged to pressurize the reactor unit in order to obtain a pressure within the reactor unit of between about 5 bar and about 30 bar.

4. A reactor system according to claim 1, wherein the Curie temperature of the ferromagnetic structured elements equals an operating temperature at substantially the upper limit of the given temperature range T of the endothermic reaction.

5. A reactor system according to claim 1, wherein the induction coil is placed within the reactor unit, around the reactor unit or around a pressure shell enclosing the reactor unit.

6. A reactor system according to claim 1, wherein the distance between windings of said induction coil is varied along a longitudinal axis of the reactor unit.

7. A reactor system according to claim 1, the catalyst material comprises two or more types of catalyst materials along the catalyst bed, where the two or more types of catalyst material have different Curie temperatures.

* * * * *